Sept. 22, 1959 A. C. AVRIL 2,904,942
METHOD OF AND APPARATUS FOR MAKING DRY PACKAGED CONCRETE
Filed Oct. 22, 1956 10 Sheets-Sheet 4

INVENTOR.
Arthur C. Avril.
BY
Wood, Herron & Evans.
ATTORNEYS.

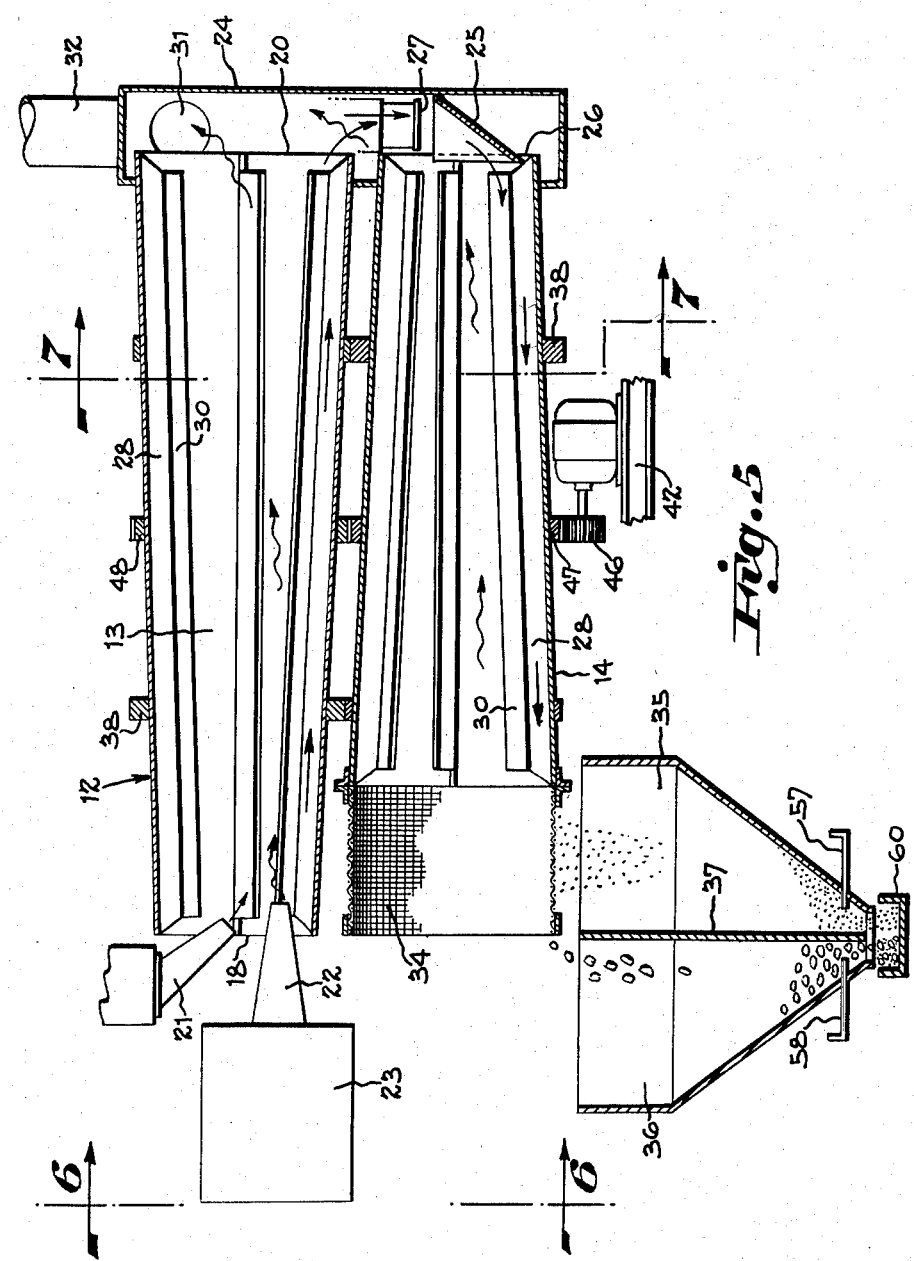

Sept. 22, 1959 A. C. AVRIL 2,904,942
METHOD OF AND APPARATUS FOR MAKING DRY PACKAGED CONCRETE
Filed Oct. 22, 1956 10 Sheets-Sheet 6
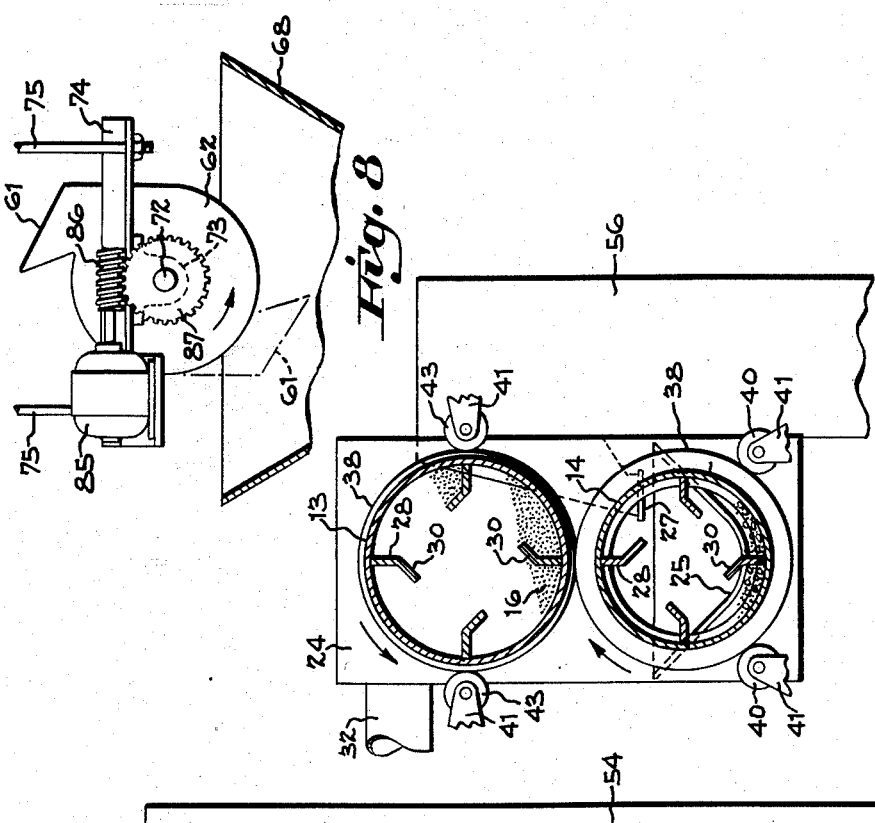
INVENTOR.
Arthur C. Avril.
BY
Wood, Herron & Evans.
ATTORNEYS.

Sept. 22, 1959　　　　　A. C. AVRIL　　　　　2,904,942
METHOD OF AND APPARATUS FOR MAKING DRY PACKAGED CONCRETE
Filed Oct. 22, 1956　　　　　　　　　　　　　　10 Sheets-Sheet 9
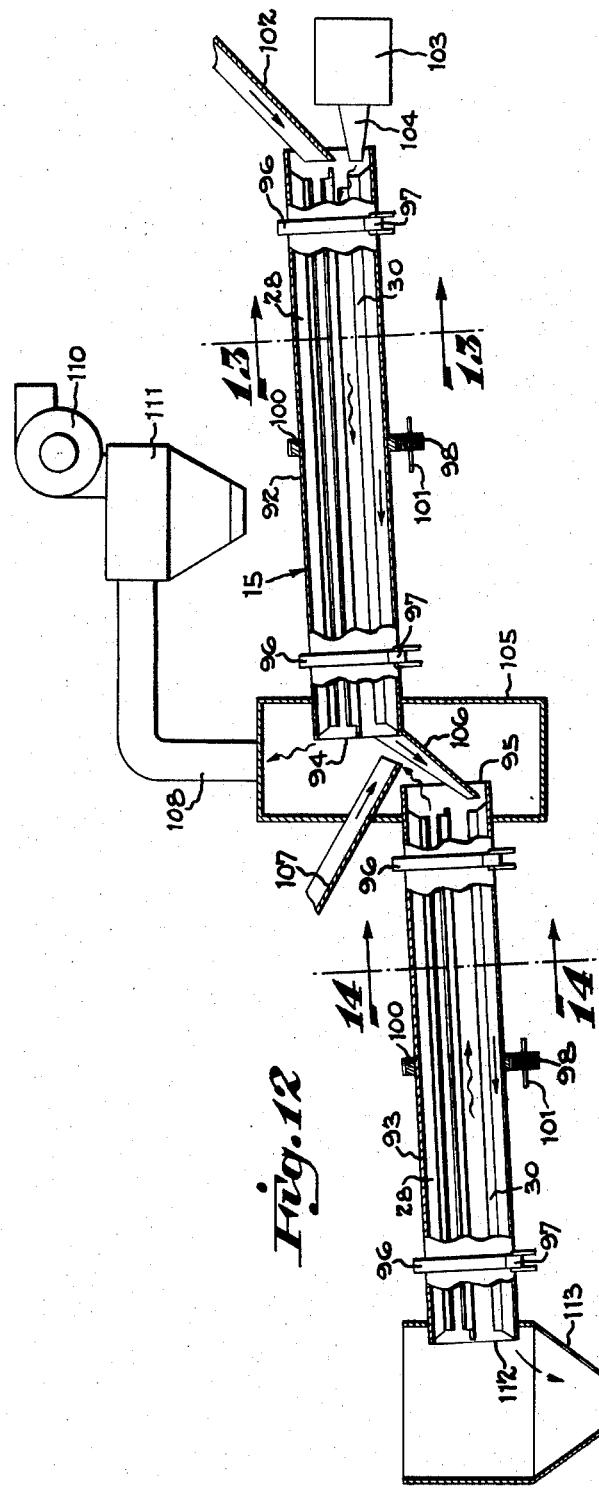
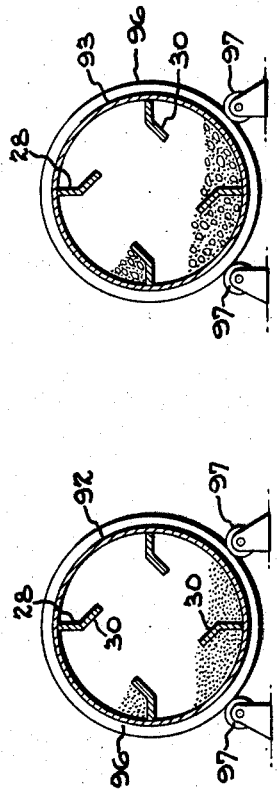
INVENTOR.
Arthur C. Avril.
BY
Wood, Herron & Evans,
ATTORNEYS.

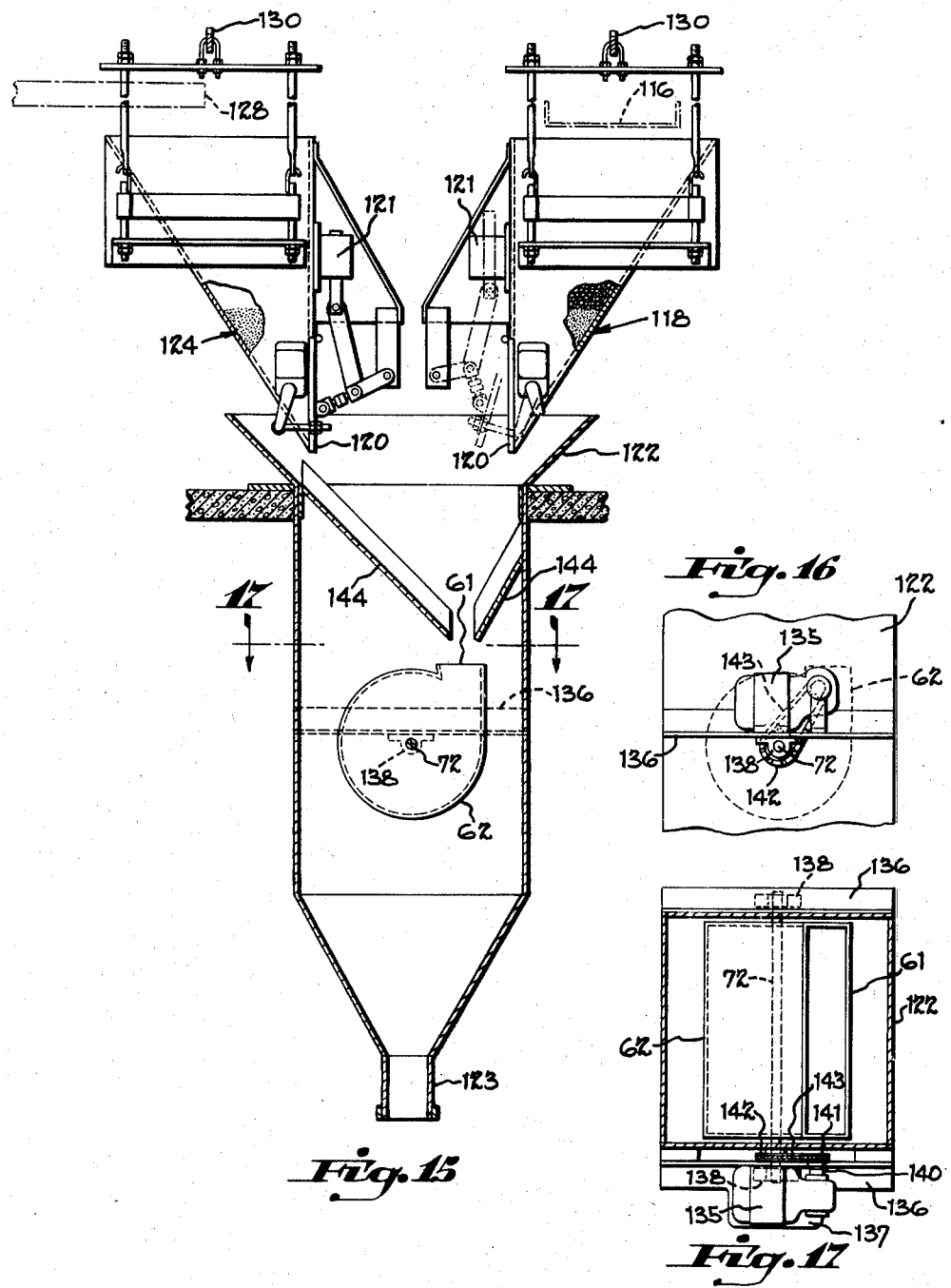

United States Patent Office 2,904,942
Patented Sept. 22, 1959

2,904,942

METHOD OF AND APPARATUS FOR MAKING DRY PACKAGED CONCRETE

Arthur C. Avril, Wyoming, Ohio, assignor to A. and T. Development Corporation, a corporation of Ohio Application October 22, 1956, Serial No. 617,375

29 Claims. (Cl. 53—25)

This invention relates to the manufacture of pre-mixed, dry packaged concrete and is a continuation in part of the co-pending application of Arthur C. Avril, Serial No. 487,758, filed on February 14, 1955, now abandoned.

At the present time, for construction work involving a substantial volume of concrete, the contractor usually purchases ready mixed concrete which is prepared by a supplier, the mixture being delivered in mixing trucks which agitate the plastic concrete in transit for direct pouring at the job. In other cases, the contractor purchases the sand, aggregate and cement and mixes them together with water in suitable equipment at the job, then pours the concrete.

Many householders wish to do small concrete jobs or repair work themselves at minimum expense. To satisfy this market, concrete is available in small packages, that is, the cement, sand and aggregate in dry condition are mixed and packaged so that the only thing the purchaser does is to mix the contents of the package with water and pour. The dry packaged concrete is also used commercially for work which requires a limited amount of concrete, the use of the packaged material being convenient to handle and economical because it eliminates waste of material.

The sand and aggregate, usually gravel, normally are in moist condition when shipped from the source of supply. This presents no problem in preparing ready mixed concrete or in mixing the concrete on the job, because water is added during the mixing operation and the mixture is poured soon afterwards. However, in the preparation of dry packaged concrete, the sand and gravel must be dried thoroughly before mixing and packaging, otherwise the mixture will hydrate when the moist ingredients are combined with the cement.

In the past, pre-mixed, dry concrete has been prepared by dehydrating the sand and gravel, metering quantities of the dehydrated sand, dehydrated gravel, and dry Portland cement in proportions to make up a batch, then mixing the dry batch and packaging it in a container. The dry sand and gravel are graded as to size and the graded materials are blended according to specifications.

The sand and gravel usually are obtained at a local source of supply, such as a gravel pit, and the material differs in mineral composition from one locality to another. The most commonly available native materials are of limestone composition, which is more or less porous. In most cases, the materials are washed with water to remove impurities before shipment to the user; consequently, surface moisture adheres by capillarity to the surface of the particles. By way of example, the sand in normal condition at delivery, may contain 4 to 12 percen surface moisture by weight. The large particles incorporated in the mixture, commonly known as gravel or coarse aggregate, have much lower surface areas than sand particles and can retain as much as 2 percent surface moisture by weight.

In addition to surface moisture, the particles also contain absorbed internal moisture, the amount of which varies from one material to another in accordance with the physical characteristics of the material. By way of example, natural limestone particles usually approximate ½ of one percent of absorbed moisture by weight. Other materials vary from this plus or minus.

In order to provide a dry concrete mixture which can be packaged and stored in warehouses for a considerable period of time before use, all of the surface moisture must be driven from the sand and gravel before packaging. In addition, it has been found that the absorbed internal moisture must be reduced from ½ of one percent to a maximum of $\frac{1}{50}$ of one percent to provide a high grade product. In other words, even if substantially all surface moisture is driven off, the gravel particles retain a sufficient quantity of absorbed moisture to at least partially hydrate the cement during the storage period and thus impair the quality of the product which finally reaches the user.

The dry mixture of sand, gravel and cement is prepared commercially at the present time by means of automatic equipment utilizing a conventional method of dehydration. A packaging plant of this character is disclosed in the patent to Arthur C. Avril, No. 2,530,501, issued November 21, 1950. This plant is provided with large capacity bins or hoppers for the bulk storage of dehydrated and graded sand and gravel, and also a dry cement bin. During each packaging cycle, the mechanism of the plant meters the required quantity of sand, gravel and cement from the bins, then mixes the ingredients and discharges them into a bag or sack in condition for storage or sale. The bag is of heavy paper, and to prevent the dry mixture from absorbing atmospheric moisture in storage, it is lined with moisture repellant material and is sealed immediately after the mixture is discharged into it.

In operating the packaging plant disclosed in the prior Avril patent, the moist sand and gravel, as received from the source of supply, are dehydrated before they reach the storage bins of the plant. According to the common method, the sand and gravel are mixed together and treated at temperatures ranging from 325 to 375 degrees F., usually while in a state of agitation with exposure to a blast flame. This treatment is sustained for a sufficient period of time to drive off all surface moisture and to reduce the absorbed moisture to approximately $\frac{1}{50}$ of one percent as indicated above. This type of heat treatment is close to the critical temperature at which many available materials are subject to partial disintegration. The disintegration probably is caused by internal vapor generated in the rapid evaporation of the absorbed water. The degeneration of the sand under treatment is a great deal less, probably because the small particle size permits rapid escape of vapor pressure.

After the combined material is heat treated, it is conveyed to vibrating screens at which point it is sized and cool air is passed through the material to delete most of the entrained heat, the graded material is then directed to the storage hoppers or bins of the packaging plant. The sand storage bin is provided with two compartments for graded sand particles and the gravel bin likewise contains two compartments for intermediate and coarse particles. Uniformity of sand gradation is accomplished by feeding from both sand bins concurrently, averaging the flows to compensate for probable segregation. The blended sand is fed into a scale hopper and metered automatically. Immediately after the predetermined amount of sand has been weighed, a combination of the two sizes of coarse aggregate is fed into the same scale hopper. The total weight of combined aggregate is controlled by automatic means.

The materials are cooled before being advanced to the storage bins because the paper bags would be seriously damaged if the dehydrated materials were dumped into them while hot. For example, at temperatures above 212 degrees F., the paper fibers exhibit a tendency to scorch, while at temperatures between 212 and 175 degrees F., the fibers are weakened temporarily by dehydration and will rupture if handled.

Briefly therefore, the conventional method of dehydration and packaging involves the problem of preventing segregation of the materials while stored in the hoppers, and the problem of cooling the materials after dehydration in order that they may be packaged without damaging the bags.

One of the primary objects of the present invention has been to provide a method of dehydrating sand and aggregates in which the surface moisture and absorbed moisture are driven from the particles at temperatures sufficiently low to preserve the quality of the particles, and sufficiently low to allow the materials to be bagged immediately after dehydration without damage to the bags. According to this method, the materials are bagged while still fairly warm but at a temperature which permits labor to handle the product without discomfort.

Another aspect of the invention relates to the method of continuous dehydration coordinated with the continuous packaging of the dehydrated materials, whereby the sand and gravel may be transported from the source of supply, advanced in continuous metered streams through a dehydrating apparatus then mixed with dry cement in successive batches and packaged without intermediate treatment or handling and without segregation of the materials during the dehydration and packaging operations.

The present invention is based primarily upon the discovery and determination that the ratio of sand to aggregate which constitutes the optimum range for dry, packaged concrete; namely 40 to 55 percent aggregate and 60 to 45 percent sand, permits the use of a new and improved method of dehydrating these materials. In general, if said or aggregate or a mixture of them are heated to any given average temperature, then individual particles during the heating process may be temporarily subjected to substantially higher temperatures which more closely approximate the temperatures of the heating mediums. These higher temperatures may be injurious to the aggregates, particularly a limestone aggregate, and to the sand if it is not a pure silica sand, which most sands are not. Nevertheless, in general, the sand is apt to be less subject to damage from excessive heating than the aggregate component of the ultimate concrete mixture.

In general, it is safe to heat sand in generally available dehydrating equipment to a sufficient temperature to dehydrate it without injury to the sand. This invention is based on the determination and discovery that if the sand is heated to a safe dehydrating temperature, preferably not greater than 375 degrees F., enough heat is stored in the sand to dehydrate the aggregate if sand and aggregate are used substantially in the ratio range hereinbefore indicated. In fact, the average temperature to which the sand need be heated to properly dehydrate the aggregate may be considerably less than 375 degrees F. depending upon the chosen ratio of sand to aggregate and the degree of hydration of the aggregate.

Thus, raw damp sand is heated to an average temperature substantially in the range of 175 to 375 degrees F. for a period sufficient to dehydrate it; the dehydrated sand is then mixed and agitated with the raw aggregate, the ratio of sand to aggregate being as hereinbefore indicated. The aggregate is dehydrated by heat transfer from the heated sand to a moisture content of less than $\frac{1}{50}$ of one percent of the absorbed moisture by weight of the combined sand and aggregate. This method reduces the mixture to a temperature substantially in the range of 130 to 170 degrees F.

Since sand retains more surface moisture than does aggregate, due to the much greater surface area of the small sand particles as compared with the larger aggregate particles, higher drying temperatures are required to dehydrate the sand than are required for aggregate. Accordingly, the sand is raised to a temperature several times greater than practical bagging temperatures; this creates surplus heat which, in the present method, is absorbed by heat exchange with the aggregate, raising the aggregate to a temperature above that where reabsorption of atmospheric moisture occurs. Conversely, this heat exchange reduces the temperature of the dehydrated sand substantially to that of the dehydrated aggregate. The average temperature range of the sand and aggregate, after heat exchange, is between 130 and 170 degrees F., as noted above.

The above-described method of dehydrating sand and aggregate, which involves heating the sand alone to the maximum temperature required, then dehydrating the aggregate by heat transfer, is far superior to the process in which the sand and aggregate components are both dehydrated in admixture or in which each is dehydrated separately. Either one of these two alternatives requires the heating of the entire mass which is constituted by sand and aggregate to whatever maximum temperature may be required for dehydration. This obviously necessitates the consumption of a greater quantity of thermal energy than the method of this invention and also requires larger and more complex processing equipment.

In other words, the method of this invention provides substantial savings in fuel and equipment. Further if aggregate is heated to the required dehydrating temperature for sand, then the mixture of sand and aggregate must be cooled before it can be bagged, otherwise the bag will be damaged. Such cooling inherently is a slow process because of the low heat conductivity of any mass of sand and/or aggregate which is of any substantial size or bulk. Also, if a mixture of sand and aggregate, with or without the Portland cement, is stored in a bin or hopper of any known design, the storage unit tends to develop a cool exterior which surrounds a hot central core. If increments are periodically fed to the top of the storage unit and periodically withdrawn from the bottom of the storage unit, the material tends to feed right through the center of the mass, i.e., the hot central core tends to be continuously replenished from the top as it is withdrawn from the bottom.

The method of dehydrating sand and aggregate of the present invention takes advantage of the relatively high ratio of radiant surface area of heated sand to surface area of unheated aggregate, whereby the heat transfer from the sand to the aggregate accomplishes two useful purposes at once. The first of these is the dehydration of the aggregate without subjecting it even temporarily to any temperature which is above the average temperature of the sand which, as a maximum, need not be substantially above 375 degrees F. The second useful function which the method of this invention accomplishes is the cooling of the sand by the aggregate to a temperature at which immediate mixing and bagging of the end-product is entirely safe. Thus, the use of storage bins or hoppers is optional and inasmuch as such storage units need not be utilized to consumate cooling, they need not be larger than necessary to provide whatever flexibility of operation is desired, if indeed they be used at all.

In the practice of the method of this invention, the sand and aggregate, after dehydration, are screened and recombined in the exact proportions desired for the product being bagged, after which predetermined quotas of sand and aggregate are mixed with predetermined quotas of dry Portland cement and then bagged. The entire operation is conducted in a manner whereby the materials are at no time subjected to conditions, in storage or otherwise, which are conducive to segregation of components, or conditions which imperil or diminish the uniformity of the mixture.

Generally speaking, the ultimate dry mix may be bagged at temperatures which range from as high as 170 degrees F. down to the temperature at which the material starts to absorb moisture from the atmosphere. This lower temperature which is appropriate for bagging will, of course, depend in part upon the temperature and humidity of the atmosphere of the environment and the length of time over which the mixture is exposed to the atmosphere. This method of drying and mixing in individual sack batches exposes the mixture to the atmosphere for a fraction of a minute. Large batch mixing from which bagfuls are drawn, according to the prior methods, expose the materials to atmospheric moisture long enough to be detrimental to the finished product. However, the concept which underlies the practice of a process which utilizes the full advantages of the invention, contemplates the application of direct heat only to the sand which, alone, is elevated to the maximum temperature utilized in the process. The hot sand is then mixed with and cooled by the aggregate which reduces the temperature of the mixture to the general range of a proper bagging temperature. The dehydrated sand and aggregate are then combined with the Portland cement and the mixture is bagged before the temperature of the ultimate mixture has fallen to the temperature of the operating environment. In general, for the sake of safety, the final product should be bagged at a temperature which is at least 20 degrees F. above atmospheric temperature.

By the method of this invention, the minimum required amount of heat is imparted to one, and only one starting material, the sand, which falls continuously in temperature after it is dried as the process progresses, but which still imparts to and assists to retain in the progressive mixture enough of the original heat imparted to it to preclude absorption of moisture from the atmosphere by the ultimate mixture at the time at which it is bagged. In short, the method provides rapid line production of the packaged drying concrete with minimum expenditure of heat and minimum requirement for equipment.

The present method is carried out in a continuous manner, the raw moist sand being conveyed in a continuous stream through an inclined, rotating sand heating drum where it is agitated in the presence of blast heat. Upon passing from the discharge end of the sand heating drum, the sand is commingled with a continuous stream of unheated raw gravel, both streams being introduced together into a rotating heat exchange drum. During passage through the heat exchange drum, while heat exchange takes place, the sand and gravel particles are agitated in the presence of flowing air streams which carry off the moisture liberated from the particles during heat exchange.

In order to carry out the continuous dehydration and packaging of the materials, the dehydration equipment preferably forms a component of the packaging plant. For this purpose, the packaging plant includes initial storage hoppers for the untreated raw sand and gravel, the hoppers being provided with adjustable feeders which advance the material in continuous metered streams to the dehydrating equipment. The feeders are adjusted to provide the correct proportion of the two materials which is ultimately to be packaged. As the commingled materials issue from the dehydrating apparatus the sand and gravel are separated by screening and discharged separately into two surge hoppers which compensate for temporary fluctuations in packaging operations. From the surge hoppers, the sand and gravel are fed at proportioned rates to a scale container with the required quantity of cement. The automatic scale determines accurately the final proportion of the ingredient of the batch; thereafter, the materials are mixed thoroughly and discharged into a bag. After being sealed, the package may be placed in storage and will preserve the dry mixture in dehydrated condition for a prolonged period.

Briefly therefore, the present method of continuous dehydration and packaging provides the advantage of immediate packaging of the materials after dehydration without damage to the bags, thus eliminating the steps of cooling the materials and the attendant equipment. The method has the further advantage of preventing segregation of the materials by eliminating the storage of materials. Instead the materials are discharged into the bags almost directly after dehydration.

Closer control of quality is provided since the flow rates of the two materials, or the dehydrating temperatures, can be varied during continuous treatment to compensate for changes in moisture content. Since the dehydrated materials are discharged into the bag at temperatures of 170 degrees F. or lower, the dehydrated materials have no opportunity to reabsorb moisture, which normally takes place when the dried materials are in storage. In other words, the heat stored in the material at the time of bagging prevents moisture reabsorption while the material advances through the packaging equipment. After being used, the material is sealed in the package and cools naturally to atmospheric temperature.

The heat exchange principle outlined above is intended for use in treating materials other than those used in a dry concrete mix, for example, in dehydrating the sand used in dry packaged mortar mix which is used in masonry work. Generally speaking, a mortar mix comprises a blend of prepared mortar cement and sand, or a blend of Portland cement and lime mixed with sand in proper proportions. In treating the sand, one portion of the sand is dehydrated by direct application of heat in the sand heater, and a second portion of the sand is then mixed with the heated sand and dehydrated by heat exchange in the heat exchange drum, utilizing the method as outlined with reference to the preparation of dry concrete, with temperature ranges to suit the character of the materials.

The heat exchange principle may also be applied to other uses, even though the discharge temperature differs from the limits outlined, because positive discharge temperature control can be accomplished by varying the proportion of cool, damp material injected into the heat exchanger. For example, in preparing sand and aggregates for an asphalt road surfacing material, of the type known in the industry as a cold mix, the treated mixture is discharged at a temperature above 170 degrees F. to provide sufficient heat for complete coating of the aggregate particles with asphalt; however, the temperature must be sufficiently low to prevent boiling off of the volatile products within the blended asphalt. In this event, the amount of aggregate fed into the heat exchanger under a given proportion of sand and aggregate conveniently may be varied to create a discharge temperature within the critical limits.

As disclosed in the drawings, two forms of dehydration apparatus are utilized in the continuous dehydration and packaging of the dry concrete mix. One form of the apparatus is intended to be utilized with an improved packaging plant of simplified design which provides certain improvements in the packaging operations. The second or modified dehydrating apparatus is disclosed in conjunction with the packaging plant of the prior Avril patent and is utilized to convert existing plants to the continuous method of dehydration and packaging. It will be understood that both forms of equipment utilize the same heat exchange principle in continuous dehydration and packaging.

The various advantages of the present method are brought out in greater detail in the following description taken in conjunction with the drawings.

In the drawing:

Figure 5 is an enlarged, longitudinal sectional view, detailing the dehydrating apparatus of Figure 1.

Figure 6 is an end elevation of the dehydrating apparatus as viewed along line 6—6 of Figure 5.

Figure 7 is a sectional view taken on line 7—7 of Figure 5, further detailing the dehydrating apparatus.

Figure 8 is an enlarged fragmentary side view of the rotary weighing and mixing hopper taken from Figure 3.

Figure 12 is an enlarged sectional view of the modified dehydrating apparatus taken from Figure 9.

Figure 13 is a sectional view taken on line 13—13 of Figure 12, further detailing the sand heating drum.

Figure 14 is a sectional view taken on line 14—14 of Figure 12, detailing the heat exchange drum.

Figure 15 is a longitudinal sectional view of the scale hoppers and mixing hopper of a converted packaging plant, of the type shown in Figure 9 but showing a modification in which a rotary scale hopper is used in place of the baffle structure in the mixing hopper.

Figure 16 is a fragmentary view of the hopper of Figure 15, showing the motor drive which rotates the mixing hopper during its dumping cycle.

Figure 17 is a sectional view taken along line 17—17 of Figure 15, further illustrating the modified arrangement.

Dehydration and packaging generally

Figure 1:
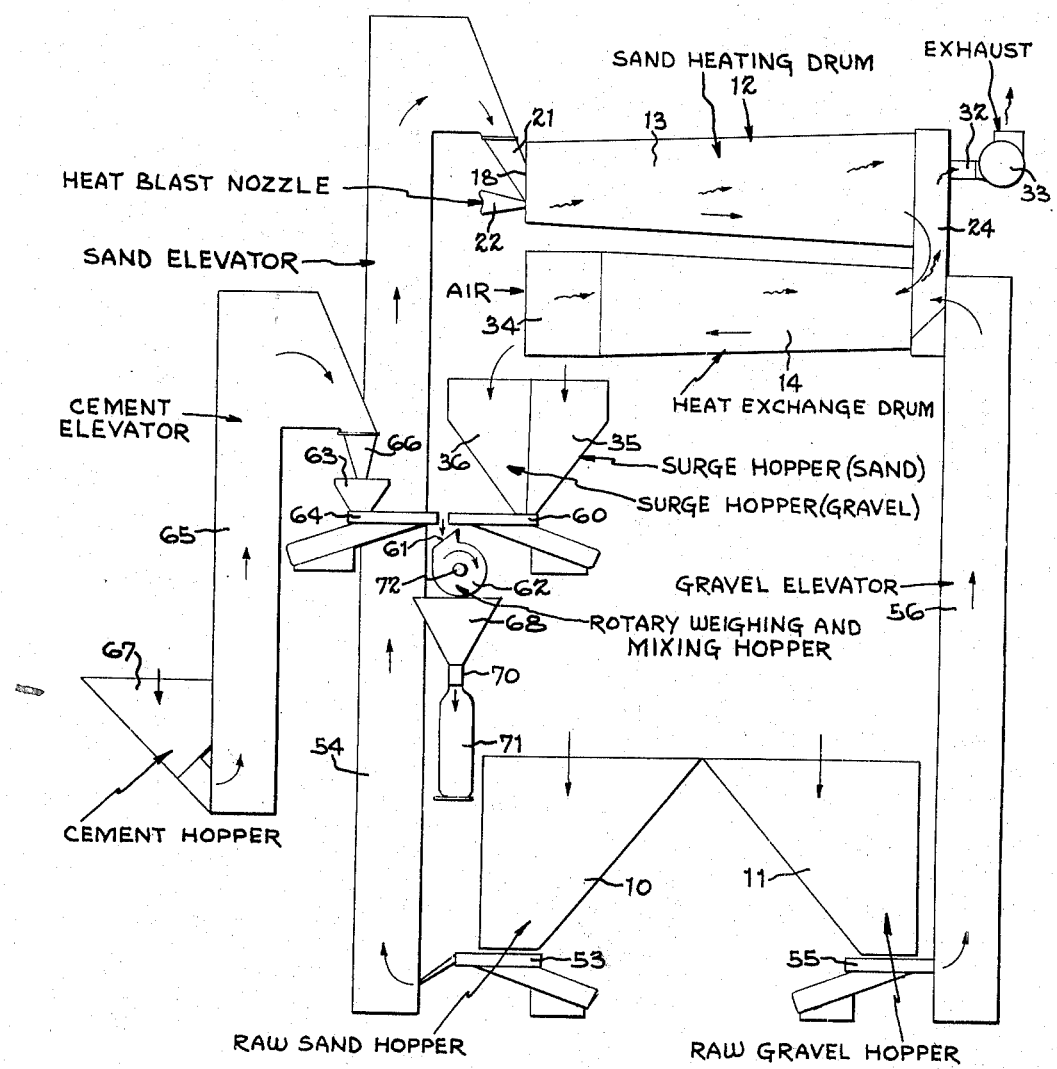
Figure 1 is a diagrammatic view of the improved packaging plant and dehydrating apparatus, illustrating generally the flow of the materials and the flow of heat and air through the dehydrating apparatus.
Figure 2:
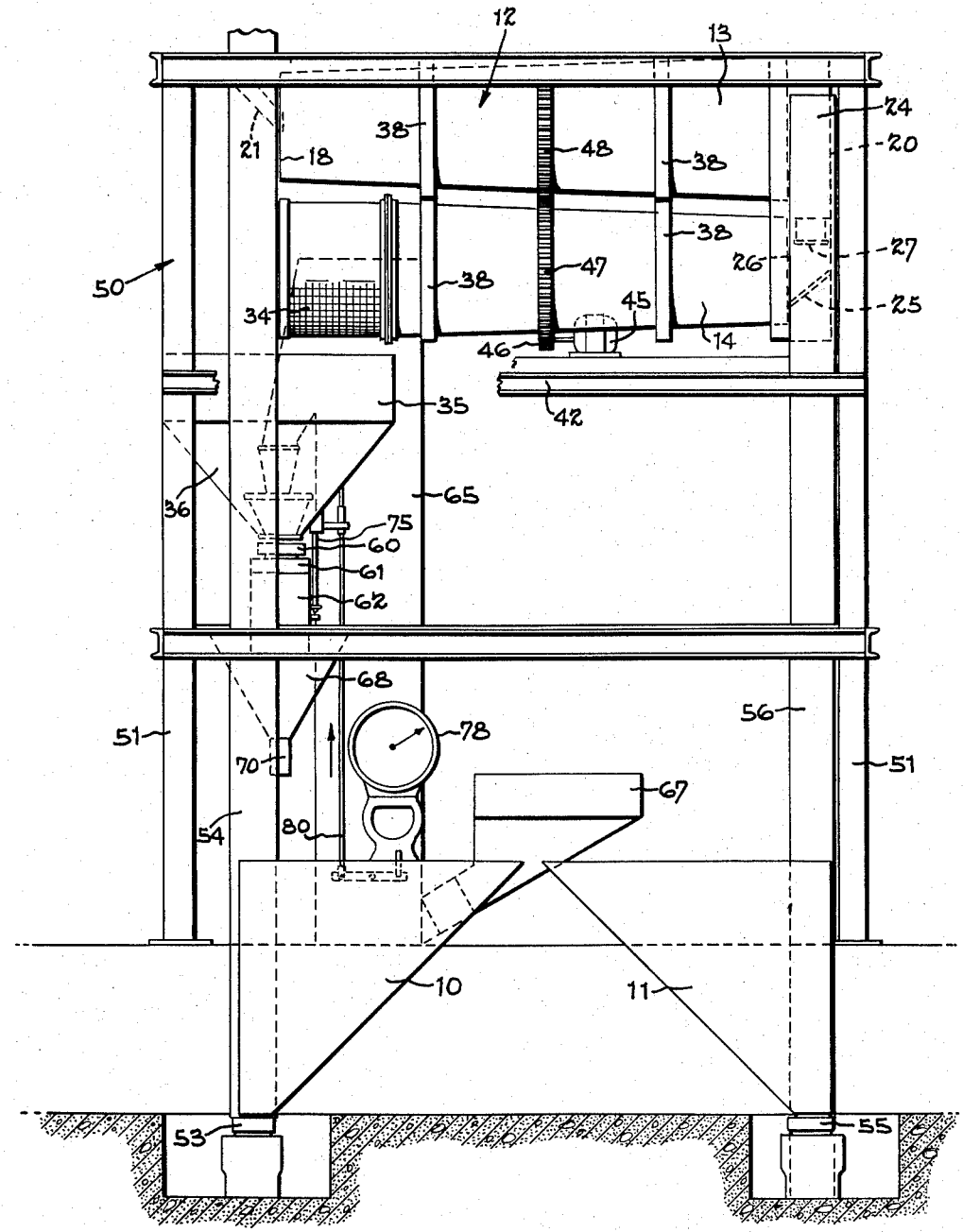
Figure 2 is a side elevation of the packaging plant and dehydrating apparatus of Figure 1.

One form of dehydrating apparatus is shown diagrammatically in Figure 1 as a component of the improved production plant for packaging pre-mixed dry concrete. It will be understood that the invention resides primarily in the improved method of continuously dehydrating sand and gravel or for other materials. Since the invention involves the method of continuous dehydration, coordinated with continuous packaging of the dehydrated materials, sufficient disclosure is made in Figures 2 to 4 of the packaging plant for an understanding of the two related operations.

Described briefly, the packaging plant shown in Figures 1 to 4 operated through successive weighing cycles, automatically metering the quantities of dry Portland cement, dehydrated sand, and dehydrated coarse aggregates, such as gravel, to create a batch of dry concrete upon each cycle. After each weighing cycle, the separate ingredients are commingled by agitation, then the mixed batch of ingredients is dumped directly into a bag. The bag is made from heavy paper and is lined with moisture resistant material to prevent absorption of atmospheric moisture by the dry concrete mixture within it. After the batch is dumped into the bag, the bag is closed and sealed, preferably by a stitching operation, and in this condition, it is ready for marketing or for warehousing. As a typical example, the batch may consist of 14 pounds of cement, 30 pounds of sand, and 46 pounds of gravel, the ingredients pre-mixed and packaged in a 90 pound bag.

According to the apparatus shown in Figures 1 to 4, the raw sand and gravel are transported from the source of supply in moist condition and are dumped directly into the storage hoppers of the packaging plant for continuous dehydration and packaging. The sand storage hopper is indicated generally at 10 and the gravel hopper at 11. From the storage hopper, the sand is conveyed in a metered stream to the dehydrating apparatus, indicated generally at 12, while the gravel is conveyed from the gravel hopper in a second metered stream to the apparatus. The stream of sand passes through the sand heating drum 13 and after being heated and dehydrated, is commingled with the stream of unheated gravel and passes through the heat exchange drum 14, as outlined above. The two materials are discharged at the indicated temperature with surface moisture removed and absorbed moisture reduced to the necessary point. The treated materials are then separated and fed to the surge hoppers of the packaging plant to be proportioned and packaged.

Figure 9:
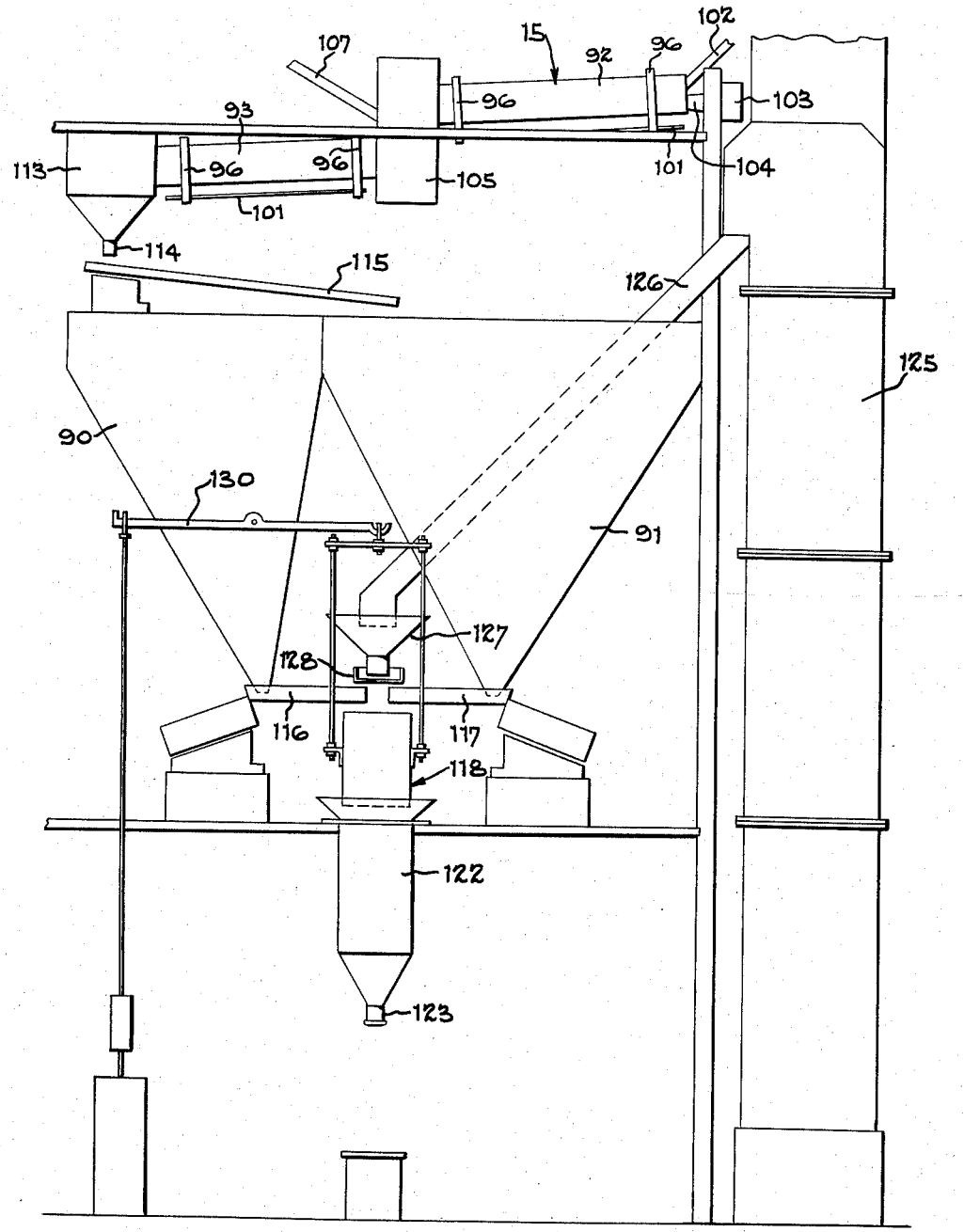
Figure 9 is a diagrammatic side elevation of the packaging plant of the prior Avril patent, utilizing a modified form of dehydrating apparatus to convert the plant to continuous operation.
Figure 10:
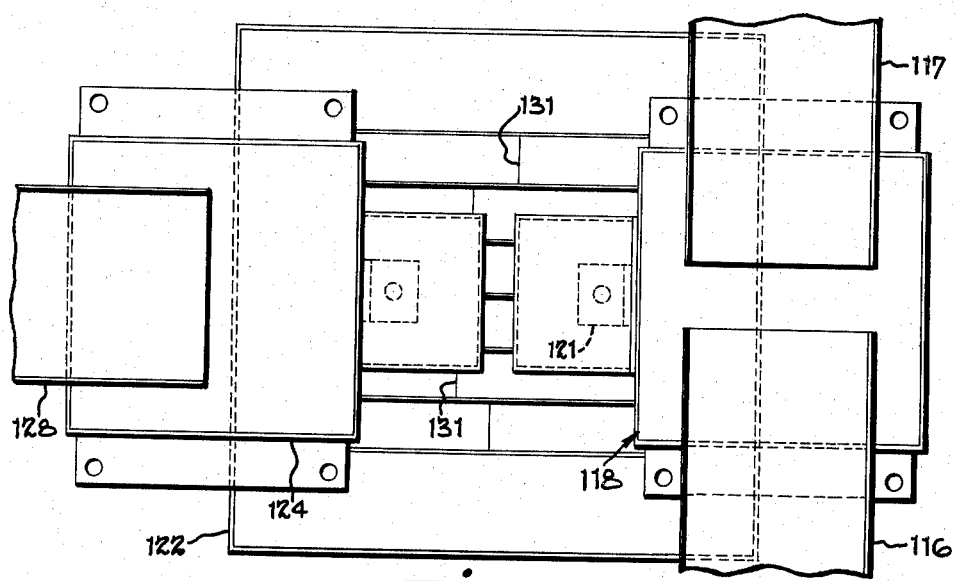
Figure 10 is an enlarged fragmentary top plan view, further detailing the weighing and mixing apparatus of Figure 9.

The final proportioning and packaging operations are similar to those disclosed in the aforesaid Avril patent, No. 2,530,501, which is shown generally in Figure 9. This plant was originally intended to be utilized with the conventional method in which the sand and gravel are dehydrated and cooled as a separate operation and stored in sufficient quantities for a given production run. As described later, a modified dehydrating apparatus, indicated generally at 15, has been combined with the plant to convert it to the continuous dehydration and packaging according to the method of this invention.

As outlined earlier, the present dehydrating method preserves the strength and quality of the gravel particles by greatly reducing the temperatures to which the gravel particles are subjected during hydration. The improved technique dehydrates the particles to the same or to a greater degree by raising the temperature of the gravel particles gradually by heat transferred from the hot sand and by maintaining the temperature for a sufficient period to permit gradual escape of absorbed moisture. During heat exchange, the mass of sand and gravel, while in a state of agitation, is exposed to a stream of air to drive off the liberated moisture.

Dehydrating apparatus having parallel drums

The dehydrating apparatus for use with the improved packaging plant is best disclosed in Figures 5 to 7. As shown, two rotating drums are mounted in parallelism one above the other, the upper drum 13 constituting the sand heating drum and the lower dum 14 consituting the heat exchanger in which the heated sand is commingled with the unheated gravel stream. The two drums are of equal length and their opposite ends are aligned with one another to conserve space. As indicated by the arrows (Figure 5), the raw sand 16 is charged into one end of the rotating sand treating drum and flows to the opposite end where its direction of flow is reversed by a deflector which directs the heated sand into the charging end of the heat exchange drum. The unheated gravel stream 17 is added to the flowing said stream at the point of flow reversal and flows with the hot sand into the changing end of the heat exchange drum.

During passage of the sand through the said heating drum, the sand is agitated in the presence of blast heat and gradually attains the temperature between 175 and 375 degrees F. as it approaches the discharge end of the drum. This is sufficient to drive off the surface moisture and also the absorbed moisture of the particles. During passage with the gravel through the heat exchange drum, the heated sand and raw unheated gravel particles are agitated and the sand particles are brought into contact with all surfaces of the gravel particles, causing an exchange of heat during passage of the materials through the drum. At normal moisture content, and with the above noted proportions of sand and gravel, the transfer of heat during passage through the exchange drum causes a reduction in sand temperature and a gradual rise in gravel temperature, the mass having a temperature not substantially greater than 170 degrees F. at the discharge end of the drum.

This treatment is sufficient to drive off the surface moisture from the gravel particles and to reduce the absorbed moisture of the particles to approximately 1/50 of one percent. The quality of the gravel is preserved because the temperature is below the critical point and is raised gradually; however, complete dehydration takes place because the rate of flow through the heat exchanger provides a prolonged treatment period. On the other hand, the temperature is sufficiently low to allow the materials to be packaged as soon as they are discharged.

The continuous treatment at controlled proportions and temperatures, inherent in the present method, allows the rate of sand and gravel treatment to be coordinated with the rate of production of the packaging equipment. Accordingly, the untreated sand and gravel may be transported from a supply source, dumped into temporary storage hoppers, then advanced from the hoppers at controlled rates directly to the drying apparatus for treatment and packaging.

As best shown in Figure 5, the said heating drum 13 and heat exchange drum 14 are located upon horizontal axes of rotation. Both drums are cylindrical and are tapered longitudinally, the sand drum having a diameter which increases from its charging end 18 to its discharge end 20. The heat exchange drum tapers longitudinally in a direction opposite to the taper of the sand drum. The degree of taper of the two drums is equal and creates a gravity flow of material longitudinally in opposite directions during rotation of the drum. The rate of flow of the materials is governed by the speed of the rotation of the tapered drums.

The sand 16 is fed continuously into the charging end of the sand drum by a spout 21 which, in the present disclosure (Figure 5), projects downwardly from sand elevator of the packaging plant. Also extending axially toward the charging end is the blast nozzle 22 of a gas or oil heater 23 which projects a blast flame longitudinally through the drum. During passage of the sand through the drum, the sand is agitated for uniform exposure to the blast flame, and upon reaching the discharge end 20, the hot sand flows into a collector housing 24, which encloses the end portion of both drums. The housing includes a downwardly inclined deflector chute 25, which is generally curved as viewed in Figure 7. The chute resides in the lower portion of the housing with its lower end communicating with the charging end of the heat exchange drum, such that the stream of sand flows by gravity down the inclined chute into the charging end 26 of the heat exchange drum 14.

The drums and housing are constructed of heavy gage sheet metal, preferably of welded fabrication. The heat blast generates a temperature which normally would overheat and gradually destroy the sand drum; however, since the surface of the drum is contacted by the stream of sand during rotation, the heat from the drum surface is partially absorbed by the sand. This keeps the temperature of the drum below the critical point.

A constant stream of gravel 17 is fed into the drum housing 24 by the gravel spout 27 which projects downwardly from the gravel elevator of the packaging plant. The gravel spout is located in one side of the drum housing (Figure 6) in a position to offer the least interference with the stream of sand issuing from the sand drum. The gravel stream discharged by the spout falls upon one side of the chute 25 and the streams of sand and gravel join one another and flow down the chute into the charging end 26 of the heat exchange drum.

In the present disclosure (Figure 5), a blast flame generator is utilized to heat the raw sand in the heating drum, although a heat blast generator is also contemplated, in which high temperature gases are passed through the sand drum. The heater 23 is of a conventional design and is not disclosed in detail; however, it includes a source of air pressure which is mixed with the fuel to supply the oxygen necessary to generate the blast flame. The heater further includes a manually operated control valve (not shown) for adjusting the blast flame, thereby to govern the treatment temperature.

As indicated in Figures 5 and 6, the drums are each provided with the agitator vanes 28 spaced apart radially and extending longitudinally of the drums. The inner edge portions of the vanes are bent angularly as at 30 to increase the scooping action. During drum rotation, the vanes of the sand drum agitate the sand to expose the particles to the blast flame for uniform heating. As indicated previously, the rate of rotation and taper of the sand drum advances a given mass of sand through the drum in a given period of time. The blast flame is adjusted to raise the mass of sand to the required temperature as the sand reaches the discharge end of the drum. It will be understood that the temperature of the blast flame may be raised or lowered in accordance with the degree of moisture contained in the material, and other variable factors, as noted above.

As the hot sand enters the charging end 13 of the heat exchange drum, it is again agitated by the vanes 28 of the heat exchange drum, this time with the unheated damp gravel. The agitator bars of the heat exchange drum thoroughly commingle the sand and gravel particles, bringing the sand particles into contact with the irregular surfaces of the gravel particles (Figure 6). The collector housing 24 completely encloses the ends of the two drums and receives the blast of hot exhaust gases from the sand drum. It includes an exhaust passageway 31 connected by a duct 32, to an exhaust fan 33. The fan pulls the exhaust gas from sand drum and also induces a flow of air inwardly through the heat exchange drum toward its charging end as indicated by the arrows (Figures 1 and 5). The induced air stream carries with it the free water vapors which are driven from the heated gravel particles. During the advancement of the sand and gravel through the heat exchanger, the particles are repeatedly exposed to the air stream as they are agitated by the vanes 28 and thus are thoroughly dried. The mixture of sand and gravel issues from the discharge end of the heat exchange drum at the indicated temperature not substantially greater than 170 degrees F., the sand temperature having been reduced gradually by heat exchange with the moist gravel particles and by heat energy lost in converting the moisture to vapor.

In order to separate the sand from the gravel, the discharge end of the heat exchange drum is provided with a cylindrical separator screen 34 having a mesh suitable to pass the sand particles and to retain the gravel. Immediately below the screen 34, there is mounted a surge hopper 35 to receive the sand as it passes through the screen. The screen has the same diameter as the drum, but is not tapered. This is done to avoid cutting the screen material on the bias.

The mixture of sand and gravel is agitated by rotation of the screen, causing all of the sand to pass through the mass into the sand hopper, while the gravel particles pass outwardly to the end of the screen. A second surge hopper 36 is positioned below the end of the screen to receive the gravel as it drops from the end of the screen. The gravel hopper is separated from its sand hopper by a wall 37. The two surge hoppers form a part of the packaging plant as described later.

Figure 3:
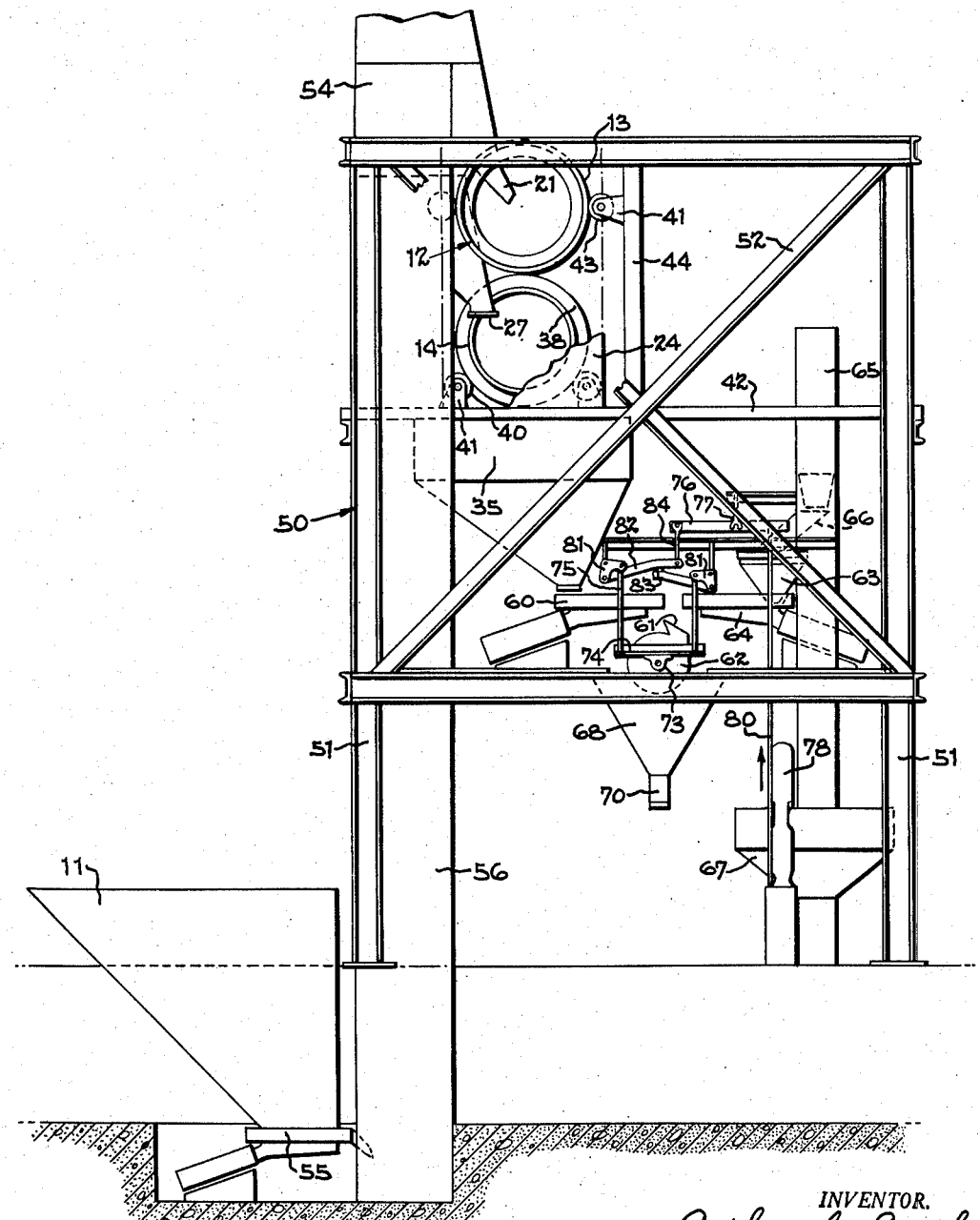
Figure 3 is an end elevation of the apparatus projected from Figure 2.
Figure 4:
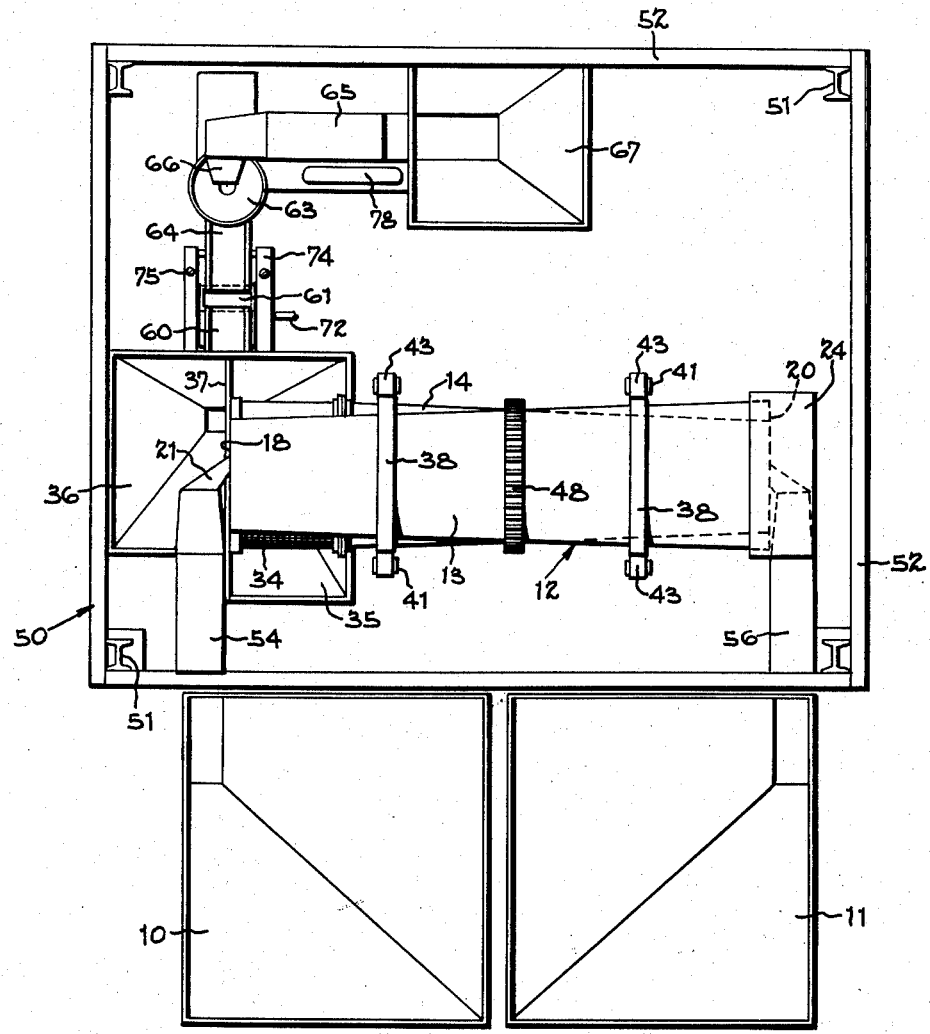
Figure 4 is a top plan view of the apparatus shown in Figure 2.

Referring to Figure 5, both drums of the drying apparatus are provided with circular bands 38 at opposite end portions, the bands of the sand drum being tracked upon the bands of the heat exchange drum. The bands of the heat exchange drum 14 are cradled between respective support rollers 40 which are journalled in brackets 41 secured to a beam structure 42 (Figure 3).

The two drums are stabilized laterally one above the other by a second set of rollers 43 tracking against the opposite sides of the sand drum 13. These rollers are also journalled in brackets 41 secured to uprights 44 of the beam structure. The drums are rotated by a motor 45 secured upon the base mounting structure 42 and having a pinion 46 meshing with a ring gear 47 which encircles the heat transfer drum. The sand drum is tracked upon the heat exchange drum by the bands 38 and is driven by a second ring gear 48 meshing with ring gear 47. This rotates the two drums in opposite directions, as indicated by the arrows in Figure 6.

During the dehydrating operation, the drums are rotated continuously by the motor 45, while the streams of sand and gravel are fed continuously to the apparatus by the sand and gravel spouts 21 and 27, thereby creating a continuous stream of dehydrated sand and gravel. When utilized with the packaging plant, the streams of sand and gravel are advanced to the spouts at respective rates of flow which are proportioned directly to the respective quantities of sand and gravel in the finished pre-mixed product. These rates in turn, are governed by the production capacity of the packaging plant, such that the dehydration and packaging cycles proceed continuously without storage of the dehydrated materials. As explained later with reference to the packaging equipment, the surge hoppers 35 and 36 provides temporary storage of the dehydrated materials, as indicated in Figure 5, and compensate for temporary fluctuations in the rate of packaging.

As indicated above, the moisture content of the sand and gravel determines the adjustment of the heater for a given rate of sand and gravel feed. It wll be understood that the examples of the sand temperature and discharge temperature of the mixture apply to a given proportion of the sand and gravel being treated. In other words, if the proportion of gravel to sand is increased, then it may be necessary to raise the treatment temperature of the sand towards the upper limit of 375 degrees F. Conversely, if the proportion of gravel is decreased, then the sand temperature may be reduced toward the 175 degree F. minimum.

By way of example, a small packaging plant of the parallel drum type, constructed according to the principles of this disclosure, has a production rate of approximately three 90 pound bags per minute, or approximately 8 tons of pre-mixed concrete per hour. The dehydrating apparatus produces the dehydrated materials at a related rate by proper regulation of the flow rates of sand and gravel to the spouts 21 and 27. These flow rates are governed by adjustable feeders which advance the raw materials from hoppers 10 and 11 to the elevators which supply the spouts. The feeders, elevators and related parts are described with reference to the packaging plant. It will be understood that production rates greater than those indicated above may be attained radily by increasing the size and capacity of the parallel drums and other components.

*Packaging plant for parallel drum dehydrating apparatus*

Referring to Figures 1 to 4, the dehydrated sand and gravel are fed to the surge hoppers and in controlled streams by a single vibrating feeder to the hopper of a weighing scale. During a weighing cycle, a cement feeder first advances a measured quantity of dry cement to the scale hopper, thereafter the sand and gravel are advanced to the hopper, such that the proportionate quantities of sand and gravel are intermingled with the cement in the hopper.

The scale hopper is suspended from the beam system of a weighing scale, which in turn, is interconnected with the electrical circuit of both vibrating feeders. When the predetermined quality of cement has been advanced to the scale hopper, the circuit decommissions the cement feeder and energizes the sand and gravel feeder. When the proportionate quantities of sand and gravel have been advanced, the sand and the gravel feeder is decommissioned, thus completing the weighing cycle.

The actual bagging operation is under manual control and is initiated by closing a treadle operated switch. This causes the scale hopper to rotate and intermix the ingredients within it, then to dump them into a mixing chute. The lower end of the mixing chute includes a spout for discharging the mixed batch into the bag. After the mixture is discharged, the operator removes the bag and advances it to a stitching mechanism; the next weighing cycle is then initiated by depressing a start button.

The components of the packaging plant and also the parallel drum dehydrating apparatus 12, are mounted in a structural steel framework, indicated at 50, consisting of uprights 51 stiffened by cross bracing 52. The dehydrating apparatus is mounted in the upper portion of the framework upon the beam structure 42, previously indicated. The surge hoppers 35 and 36 are supported by the framework below the dehydrating apparatus.

The supplies of raw sand and gravel, to be advanced to the dehydrating apparatus, are stored in the sand storage hopper 10 and gravel storage hopper 11, as indicated earlier. These hoppers preferably are located outside the plant in order that the materials may be transported and dumped directly into them. The sand is fed from its hopper by an electrically operated vibrating feeder 53 located beneath the discharge opening of the hopper and leading a sand elevator 54. The sand elevator conveys the sand to the sand spout 21, previously indicated. The rate of flow of the sand is regulated by an adjustable rheostat which controls the voltage impressed upon the vibrating feeder. The rheostat therefore governs the rate of sand flow through the sand heating drum 13 of the dehydrating apparatus.

The gravel is advanced from the gravel hopper 11 by an electrically operated vibrating gravel feeder 55, similar to the sand feeder. The gravel feeder advances the gravel at a controlled rate to a gravel elevator 56 which conveys the stream of gravel to the gravel spout 27. The vibrating feeder for the gravel is also governed by a rheostat which provides the desired rate of flow. Accordingly, the adjustment of the rheostats determines the proportion of sand and gravel which ultimately is packaged. The details of this apparatus have been omitted from the drawings since they form no part of the present invention.

The streams of dehydrated sand and gravel separated by the cylindrical screen 34 are stored temporarily in the surge hoppers 35 and 36 which act as reservoirs to maintain a continuous supply of material to compensate for delays which may occur in normal packaging operations. In other words, the drying apparatus operates continuously, while the bagging operations are intermittent under manual control; therefore, the hoppers continue to accumulate the materials if the bagging operations are interrupted temporarily.

In addition, the surge hoppers act as final metering stations for the streams of sand and gravel, the proportionate flow of the two materials being controlled precisely by the adjustable gates 57 and 58 (Figure 5), mounted in the delivery passageways of the surge hoppers. The surge hoppers therefore correct any change in the proportion in the materials which may have occured during their delivery from the outside storage hoppers to the dehydration apparatus.

From the surge hoppers, the metered streams of sand and gravel are advanced together by a vibrating feeder 60 to the open receiving spout 61 of a rotary scale hopper and mixer 62. The vibrating feeder 60 is substantially identical to the feeders 53 and 55 previously noted, and the rate of feed may be adjusted by a rheostat in a similar manner.

During the weighing cycle, the dry, measured quantity of Portland cement is fed into the spout 61 of the scale hopper 62 to be weighed in advance of the batch of gravel and sand. This provides more precise weighing of the cement and also provides an improved mixing action for the materials, since the heavier particles of sand and gravel penetrate the loose mass of cement in the hopper as they drop from their feeder into the hopper. The pulverized cement also acts as a lubricant between the particles and hopper surface during the mixing and dumping operation. The cement is fed to the scale hopper and mixer 62 from a cement surge hopper 63 by the vibrating feeder 64 which also may be rheostat controlled for rate of feed. The cement is advanced to the surge hopper by a cement elevator 65 which includes a downwardly inclined spout 66 leading to the surge hopper 63. The elevator withdraws the cement from a cement storage hopper 67.

It is to be noted that the vibrating feeders may be spaced approximately two feet above the open spout of the scale hoppers. As the cement feeder advances the stream of cement to the hopper, the cement is aerated during its drop from the end of the feeder and is accumulated in a loose fluffy condition in the hopper. In this condition the loose cement occupies approximately 30 percent more volume than in its packed condition.

After the predetermined quality of cement is advanced to the hopper, the cement feeder is decommissioned automatically by the scale apparatus. Thereafter, the sand and gravel feeder 60 is energized, causing the proportionate streams of sand and aggregates to be advanced to the hopper, the materials dropping from the end of the feeder and passing through the loose mass of cement, as indicated above. The feed continues until the predetermined quality of sand and aggregates is advanced to the hopper, thereupon the scale apparatus decommissions the feeder.

As noted earlier, the actual bagging operation is initiated by the operator who depresses a treadle actuated dumping switch after the weighing cycle is completed. The scale hopper is generally cylindrical and resides with its axis in a horizontal plane, the open spout 61 projecting upwardly, generally at a tangent from the cylindrical wall of the hopper. Immediately, beneath the scale hopper is mounted the mixing chute or hopper 68 including a discharge spout 70 projecting downwardly from its lower end.

During the weighing cycle, the operator inserts the open end of a bag 71 (Figure 1) upon the lower end of the spout, and after completion of the cycle, he depresses the treadle to initiate the dumping operation. This causes rotation of the scale and mixing hopper 62 about its horizontal axis through 360 degrees of rotation, as indicated in Figure 8. During rotation, the materials within the hopper are agitated and, as the spout swings through the lower portion of its arc, the materials flow outwardly through the spout. This causes discharge of the materials in a sustained stream, thus distributing the materials across the mixing chute 68 to further intermix the ingredients as they strike the surfaces of the chute and flow into the bag. After the mixing and dumping operation, the operator removes the bag for the stitching operation and depresses a start button which initiates the next weighing cycle.

As best shown in Figures 3 and 8, the scale hopper has a shaft 72 rotatably journalled as at 73 upon a floating frame 74 which is suspended by links 75 from a scale beam 76. The scale beam is suspended as at 77 and is connected to the weighing scale 78 by means of the link 80. The scale includes suitable switches which are interconnected with the control system of the feeders to deenergize the feeders in response to the loading of the scale hopper as outlined above.

To increase sensitivity, the links 75, which support the floating frame 74, are suspended from bell crank levers 81, the opposite ends of the bell crank levers being pivotally connected to a pair of toggle levers 82—82 having inner ends linked together as at 83. The inner end of one of the toggle levers is connected by a link 84 to the end of the scale beam 76. As the scale hopper is loaded, its downward motion tends to pull the toggle levers 82 outwardly, by operation of the bell crank levers 81. The outward movement results in a downward toggle motion which acts through the scale beam 76, to impart upward motion to the link 80, as indicated by the arrow. The several pivot bearings of the links and beams are of the knife edge type common in scale construction to eliminate frictional resistance.

Referring to Figure 8, the hopper is rotated by a motor 85 which is mounted upon the floating frame 74, the motor including a worm 86 meshing with a worm wheel 87 attached to the shaft of a scale hopper. When the operator depresses the dump treadle, the motor is energized to rotate the hopper. The hopper includes suitable limit switch mechanism interconnected with the control system to deenergize the motor and thereby limit the rotary motion of the hopper to 360 degrees. When the motor is deenergized, the hopper is stopped with its spout projecting upwardly toward the feeders as shown in Figure 3, and remains in this position until the next dumping cycle is initiated.

*Dehydration apparatus for existing packaging plants*

Referring to Figures 9 to 12, a modified form of dehydrating apparatus is illustrated as a part of the packaging plant of the prior Avril patent. The modified dehydration apparatus follows the heat transfer principle and is utilized to convert the packaging plant to continuous dehydration coordinated with continuous packaging. The packaging plant was originally intended to be operated independently of the conventional dehydration equipment and is provided with storage bins for the dehydrated materials. As indicated earlier, conventionally the materials are dehydrated in a separate operation and stored in the bins for a cooling period in sufficient quantity to provide a continuous production run. The modified dehydrating equipment converts the plant to continuous dehydration and packaging with substantially no change in the operation of the original plant.

Referring to Figure 9, the storage bin for the treated sand is indicated at 90, and the storage bin for the gravel is indicated at 91. When utilized with the continuous dehydrating apparatus, which is indicated generally at 15, the storage bins are utilized as surge hoppers to receive the materials as they are dehydrated and separated in continuous streams. Accordingly, the bins remain only partially filled and act as temporary reservoirs to accommodate delays which normally occur in the packaging operations.

As shown in Figure 12, the dehydrating apparatus consists of a cylindrical sand heating drum 92 and a heat exchange drum 93, the drums being disposed in end-to-end relationship on respective downwardly inclined axes with their adjoining ends adjacent one another. The axis of the sand heating drum 92 is located above the axis of the heat exchange drum, such that the hot sand may flow by gravity from the discharge end 94 of the sand drum to the charging end 95 of the heat exchange drum.

Each drum includes a pair of circular tracking bands 96—96 at opposite end portions, the bands tracking upon pairs of spaced rollers 97 to support the drums for rotation. The drums are rotated by driving gears 98 meshing with ring gears 100 encircling the drums. The driving gears are keyed upon shafts 101 which are driven in common by a transmission powered by a motor (not shown).

The raw sand is advanced to the charging end of the sand drum by the chute or conveyor 102 projecting from a sand elevator. The sand elevator, which is not shown, is similar to the structure previously described and includes a supply hopper for the raw sand and vibrating feeder which conveys a metered stream of sand to the elevator. A heater 103 including a blast nozzle 104, projects a blast flame into the charging end of the drum to heat the sand. Both drums are provided with internal agitator vanes 28, as described earlier, for agitating the material during passage through the drums.

The discharge end 94 of the sand heating drum projects into a drum housing 105, which also encloses the charging end 95 of the heat exchange drum. An inclined deflector chute 106 resides within the housing with its lower end projecting into the heat exchange drum and its upper end extending below the discharge end of the sand drum. The raw gravel is advanced by conveyor or chute 107 which projects downwardly at an angle through the housing in a position to direct a stream of gravel toward the deflector chute 106. The raw gravel may be advanced from a gravel hopper at a rate proportioned to the stream of sand by means of a vibrating feeder and elevator, as explained earlier, the metered stream flowing from the elevator by way of the chute 107.

The sand reaches a temperature ranging up to 375 degrees F. at the discharge end of the sand drum and heat from the sand is transferred to the gravel particles as the gravel and sand are commingled and advanced through the heat exchange drum, as explained earlier. The housing 105, which is completely enclosed, includes a passageway connected to a conduit 108 leading to an exhaust fan 110. The fan draws off the exhaust gases from the sand heating drum and induces a flow of air through the heat exchange drum. The induced air flow carries off the moisture which is generated in the heat exchange drum so as to increase the efficiency of the treatment. The exhaust gases and induced air stream are passed through the separator 111 to remove dust particles.

At the discharge end 112 of the heat exchange drum, the mixture of dehydrated sand and gravel is discharged into a surge hopper 113. The materials are discharged at a temperature not substantially greater than 170 degrees F., as explained earlier. The surge hopper includes an open spout 114 communicating with one end of a vibrating screen 115. As shown in Figure 9, the screen, which is downwardly inclined, extends across the open top of the sand bin 90, with the discharge end of the screen communicating with the gravel bin 91. The screen has a mesh which allows the sand particles to drop through to the sand bin, the gravel particles being carried to the discharge end of the screen to drop into the gravel bin.

The feeding of the sand, gravel and cement to the scale hopper follows the disclosure of the prior Avril patent. Briefly, as disclosed in Figure 9, the materials from the sand and gravel bins are advanced by the vibrating feeders 116 and 117 to a scale hopper 118, the hoppers having discharge openings communicating with the feeder. In the present method, the sand and gravel bins 90 and 91 act as temporary surge hoppers instead of storage bins, since the materials are fed from the bins to the weighing apparatus soon after it is charged into the bins.

Figure 11:
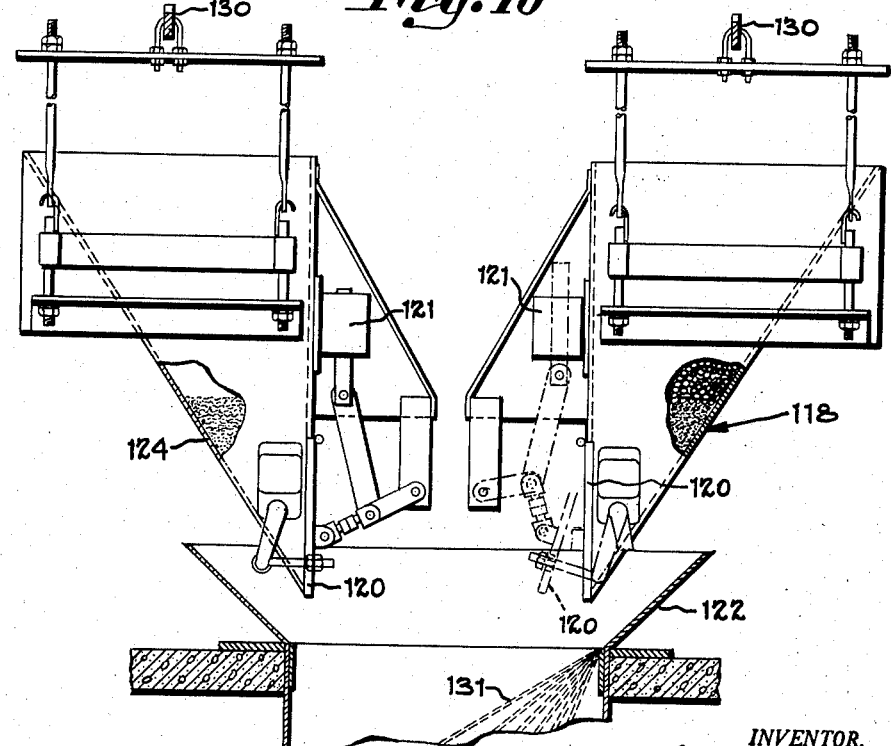
Figure 11 is a fragmentary side elevation projected from Figure 10, further illustrating the weighing and mixing apparatus.

As shown in Figure 11, the sand and gravel is fed in sequence to the scale hopper 118, the sand being charged in first and the gravel on top of the sand to segregate the mass. While the sand is being weighed, the gravel accumulates temporarily in the gravel hopper to be weighed immediately after the sand is weighed. The lower portion of the scale hopper includes a discharge door 120 which is operated by a solenoid 121. When the solenoid is energized, the door is opened, as indicated in broken lines, to allow the materials to flow into the mixing hopper 122 which includes a spout 123 at its lower end to receive the bag.

The cement is weighed in a second scale hopper 124 which is located opposite the sand and gravel scale hopper 118. The cement is advanced by a cement elevator 125 having an inclined chute 126 leading to a cement hopper 127. The cement hopper includes a vibrating feeder 128 for advancing the cement to the second scale hopper 124. This hopper also includes a solenoid operated door 120 for discharging the cement into the mixing hopper 122. The scale hoppers 118 and 124 are suspended from respective scale beams indicated generally at 130—130 which are interconnected with an electrical control system.

The weighing cycle is initiated by manual operation of a starting switch. This energizes the vibratory feeders for the cement and sand. When the required quantity of sand is charged into the sand and gravel hopper, it overbalances its scale beam to a given position, causing the control system to stop the sand feeder and to start the gravel feeder. The gravel continues to feed until the scale beam is deflected to a second position, causing the gravel feeder to be stopped. The scale hopper for the cement controls the cement feeder in the same manner. Thus, the operation is independent for each of the feeders and each continues to feed until its particular material is charged into the scale hopper. When both hoppers 118 and 124 are charged, a dump button is depressed, causing the doors 120—120 to open and allow the ingredients to flow into the mixing hopper for discharge into the bag which is placed upon its discharge spout.

The mixing hopper is provided with baffles 131 (Figure 11) having differential slopes and are separated from one another to divide the sand and aggregates into individual streams, each stream having a different rate of flow. These baffles are located at one side of the hopper beneath the discharge opening of the sand and gravel scale hopper 118. Beneath the discharge opening of the cement scale hopper 124 there is provided a deflector plate (not shown) residing at an angle to intercept the streams of sand and gravel. The cement flows down the baffle plate and is intermingles with the streams of sand and gravel, the ingredients being thoroughly intermixed as they drop into the bag. The bag thereafter is removed from the spout and stitched as indicated earlier.

*Modified weighing apparatus*

According to the modified weighing apparatus shown in Figures 15–17, the rotary scale hopper and mixer unit 62 is mounted within the mixing hopper 122 in place of the baffles 131 above described. The rotary hopper in this case is not utilized for weighing the materials, but rather as a means of mixing them thoroughly as they discharge into the bag. As best shown in Figure 16, the motor 135 which drives the rotary hopper, is mounted upon angle irons 136—136, similar to the angle irons 74 shown in Figure 8; however, in this case, the angle irons are welded or otherwise attached externally to the opposite sides of the mixing hopper 122 and spaced outwardly from the hopper. The motor is carried upon a mounting plate 137 which is welded or otherwise attached to one of the angle irons. The rotary hopper 62 is carried upon the cross shaft 72 which has its opposite ends journalled in anti-friction bearings 138 of the angle irons. Motor 135 is a gear head, speed reducing type, including a drive shaft 140 which carries a drive sprocket 141. A driven sprocket 142 is keyed to cross shaft 72, the two sprockets being connected by a sprocket chain 143 which passes through the space between the hopper and angle iron 136.

As shown in Figure 15, hopper 62 is normally stationary with its spout 61 in the upright position directly below the lower edges of a pair of inclined baffles 144. The baffles have their opposite side edges joined to the side walls of the stationary hopper so as to collect all of the materials as they are discharged from the scale hoppers 118 and 124, thereby to direct the materials into the open spout 61.

The weighing cycle is initiated by manual operation of a starting switch as described in the Avril patent, whereby the vibratory feeders 116, 117 and 128 for the sand, gravel and cement are energized, the cement feeder charging into the cement scale hopper 124, the sand and gravel being sequentially charged into hopper 118. It will be understood that the rotary hopper must remain stationary in its receiving position until the contents of both scale hoppers are completely discharged into it. For this purpose, motor 135 of the rotary hopper may be interconnected in the electrical circuit which controls the doors 120—120 of the scale hoppers 118 and 124, altering the existing circuit to cause the doors 120 to open automatically when the required weight of material is charged into the scale hoppers, thus charging the rotary hopper. The control circuit includes a dump button which energizes the motor of the rotary hopper upon being depressed manually after the rotary hopper is charged.

As described above with reference to the scale mechanism shown in Figure 8, the rotary hopper mechanism includes suitable limit switch mechanism, also interconnected in the control system to deenergize the motor with the hopper spout in upright position after the hopper completes 360 degrees of rotation. Accordingly, the sand, aggregate and cement are mixed thoroughly together during rotation of the hopper, then they are discharged as the spout passes through the lower portion of its arc of rotation, causing the mixed contents to drop down the mixing chute into the bag which is located at the spout 123. The rotary scale hopper 62 thus may be utilized as a mixing chute, similar to the action of the hopper 62 and chute 68, thereby providing the rotary mixing action without substantial change in converting an existing plant.

Having described my invention, I claim:

1. In the process of manufacturing and packaging dry, premixed concrete, the steps of advancing a stream of raw sand and during advancement agitating the sand in the presence of a blast flame to raise the temperature of the sand sufficiently to dehydrate the same, mixing the stream of dehydrated hot sand with an advancing stream of raw, unheated aggregate, agitating and advancing the mixed stream of sand and aggregate to partially cool the sand and dehydrate the aggregate by heat transfer between the sand and aggregate, intermittently collecting predetermined quantities of the dehydrated sand and aggregate and mixing the same with predetermined quantities of dry hydraulic cement, and successively packaging said mixed quantities of sand, aggregates and cement in moisture resistant paper containers at a temperature above 130 degrees F., to prevent reabsorption of moisture.

2. In the process of manufacturing and packaging dry, pre-mixed concrete, the steps of heating a metered stream of raw sand by agitating and advancing the stream in the presence of heat for a sufficient period to raise the temperature of the sand to a range between 325 and 375 degrees F. to dehydrate the sand, mixing a metered stream of raw, unheated aggregate with the advancing stream of sand while the sand remains substantially at said dehydrating temperature, agitating and advancing the mixed stream of sand and aggregate to partially cool the sand and dehydrate the aggregate by heat transfer between the sand and aggregate, the metered stream of aggregate being proportioned to the metered stream of sand to raise the aggregate to a temperature between 130 and 170 degrees F. during heat exchange, periodically collecting a quantity of the dehydrated sand and dehydrated aggregate during continuous advancement of said materials and mixing the same with a quantity of dry hydraulic cement, and packaging said mixture in a moisture resistant paper container substantially at said temperature between 130 and 170 degrees F. to prevent the weakening of the paper container on one hand and to prevent reabsorption of moisture by the dehydrated materials on the other hand.

3. In the process of continuously manufacturing and packaging dry, pre-mixed concrete, the steps of advancing a stream of raw unheated sand at a metered rate which determines the quantity of sand in the dry concrete mixture, heating the advancing stream of sand to a temperature between 325 and 375 degrees F. to dehydrate the same, advancing a stream of raw unheated gravel at a rate which determines the portion of gravel in the dry concrete mixture, adding the stream of gravel to the stream of hot dehydrated sand, advancing the streams of sand and gravel and commingling the same to transfer the heat stored in the sand to the gravel to dehydrate the gravel and decrease the temperature of the sand, the temperature of the mixture being between 130 and 170 degrees F., separating the dehydrated sand and gravel, temporarily accumulating the separated materials, for a period insufficient to cool the materials, feeding the accumulated sand and gravel in proportions metered for a mixture of dry concrete, feeding dry cement in a proportion metered for a mixture of dry concrete, mixing the sand, gravel and cement, and packaging the mixture in a moisture resistant paper container at said temperature between 130 and 170 degrees F. to prevent reabsorption of moisture.

4. A method of preparing and packaging dry concrete which is constituted by sand, aggregate and Portland cement, said method comprising heating raw moist sand to an average temperature not substantially greater than 375 degrees F. for a period of time sufficient to dehydrate and heat the sand, mixing and agitating the hot dehydrated sand with raw unheated aggregate for a period of time sufficient to provide heat transfer from the hot sand to the raw aggregate, whereby the aggregate is dehydrated by heat exchange while the temperature of the sand is lowered substantially, mixing the dehydrated sand and dehydrated aggregate with portland cement, and packaging said mixture in waterproof containers before the mixture has fallen to atmospheric temperature and while a sufficient percentage of the heat initially imparted to the sand is retained in the mixture to prevent reabsorption of moisture from the atmosphere by the mixture.

5. A method of preparing and packaging dry concrete which is constituted by sand, aggregate and Portland cement, said method comprising heating raw moist sand to an average temperature not substantially greater than 375 degrees F. for a period of time sufficient to dehydrate the sand, mixing and agitating the hot dehydrated sand with raw moist unheated aggregate for a period of time sufficient to provide heat transfer from the hot sand to the raw aggregate, whereby the aggregate is dehydrated by heat exchange while the temperature of the sand is lowered substantially, mixing the dehydrated sand and dehydrated aggregate with portland cement, and packaging said mixture in waterproof containers while the temperature of the mixture is at least 20 degrees F. above atmospheric temperature, thereby to prevent reabsorption of moisture from the atmosphere by the mixture.

6. A method of preparing and packaging dry concrete which is constituted by sand aggregate and Portland cement, said method comprising heating raw moist sand to an average temperature between 175 and 375 degrees F. for a period of time sufficient to dehydrate said sand, mixing and agitating the hot dehydrated sand with raw aggregate for a period of time sufficient to permit heat transfer from the sand to the aggregate, whereby the aggregate is dehydrated and the temperature of the sand is lowered substantially, mixing dehydrated sand and dehydrated aggregate with Portland cement, and packaging said mixture in moisture-proof containers before the mixture has fallen to atmospheric temperature and while a sufficient amount of the heat initially imparted to the sand is retained in the mixture to prevent reabsorption of moisture from the atmosphere by the mixture.

7. In the process of manufacturing and packaging dry pre-mixed concrete, the steps of advancing a stream of raw sand and during advancement agitating the sand in the presence of a heat blast to raise the temperature of the sand sufficiently to dehydrate the same, mixing the stream of hot dehydrated sand with an advancing stream of raw unheated aggregate, mixing and advancing the sand and aggregate to partially cool the sand and dehydrate the agregate by heat transfer between the sand and aggregate, intermittently collecting predetermined quantities of the dehydrated sand and aggregate during advancement of said materials, and mixing the sand and aggregate with predetermined quantities of dry hydraulic cement, and successively packaging said mixed quantities of sand, aggregate and cement in moisture resistant paper containers at a temperature sufficiently above atmospheric temperature to prevent reabsorption of moisture from the atmosphere by the mixture.

8. In the process of manufacturing and packaging dry pre-mixed concrete, utilizing raw sand and raw aggregate containing surface moisture and absorbed internal moisture, the steps of heating raw sand to a temperature between 175 and 375 degrees F. for a sufficient period to drive off the surface moisture and the absorbed internal moisture from the sand particles, mixing the sand while substantially at said temperature with raw aggregate to cause an exchange of heat from the hot sand particles to the raw aggregate particles, the proportion of sand and agregate being such to elevate the aggregate particles to a temperature which is lower than the critical temperature at which the aggregate particles are subject to disintegration but sufficiently high to drive off the surface moisture and to reduce the absorbed moisture of the aggregate particles to a maximum of $\frac{1}{50}$ of one percent by weight, and packaging the mixture of the dehydrated sand, dehydrated aggregate and dry hydraulic cement in a moisture resistant container while said mixture retains a temperature sufficiently above atmospheric temperature to prevent reabsorption of atmospheric moisture by the mixture.

9. In the process of manufacturing and packaging dry pre-mixed concrete, utilizing raw sand and raw aggregate containing surface moisture and absorbed internal moisture, the steps of heating an advancing stream of moist raw sand to a temperature between 175 and 375 degrees F. to drive off the surface moisture and the absorbed internal moisture from the sand particles, mixing the advancing stream of sand while substantially at said temperature with an advancing stream of raw moist aggregate to cause an exchange of heat from the hot sand particles to the raw aggregate particles, the proportion of sand and aggregate being such to elevate the aggregate particles to a temperature which is lower than the critical temperature at which the aggregate particles are subject to disintegration but sufficiently high to drive off the surface moisture and to reduce the absorbed moisture of the aggregate particles to a maximum of $\frac{1}{50}$ of one percent by weight, and packaging the mixture of the dehydrated sand, dehyderated aggregate and dry hydraulic cement in a moisture resistant container while said mixture retains a temperature sufficiently above atmospheric temperature to prevent reabsorption of atmospheric moisture by the mixture.

10. In an apparatus for manufacturing and packaging dry pre-mixed concrete, a thermal sand drier, means for feeding raw sand in a continuous stream through the drier at a predetermined rate, a heat exchanger, means for feeding raw gravel in a continuous stream through the heat exchanger at a predetermined rate, means for feeding the heated sand from the sand drier to the heat exchanger, thereby to dehydrate the raw gravel by heat exchange between the sand and gravel, a dry concrete mixer, means for feeding dry cement to the said mixer in predetermined amounts, and means for feeding gravel and sand from the heat exchanger to said mixer in predetermined amounts.

11. In an apparatus for manufacturing and packaging dry, pre-mixed concrete, a raw sand storage bin, a thermal sand drier, means for feeding sand from the storage bin in a continuous stream through the drier at a predetermined rate, a raw gravel storage bin, a heat exchanger, means for feeding gravel from the storage bin in a continuous stream through the heat exchanger at a predetermined rate, means for feeding the heated sand from the sand drier to the heat exchanger, thereby to dehydrate the raw gravel by heat exchange between the sand and gravel, a cement storage bin, a dry concrete mixer, means for feeding cement from the cement storage bin to the said mixer in predetermined amounts, and means for feeding gravel and sand from the heat exchanger to said mixer in predetermined amounts.

12. An apparatus for manufacturing and packaging dry, premixed concrete, comprising a sand heater, a sand conveyor communicating with the sand heater for advancing raw, moist sand through the heater in a continuous stream, means for heating and dehydrating the sand in the sand heater, a heat exchanger having discharge means, means connecting the sand heater with the heat exchanger for directing the stream of hot sand into the heat exchanger, a gravel conveyor communicating with the heat exchanger for advancing raw, moist gravel through the heat exchanger in a continuous stream, means for commingling the hot sand and raw gravel during continuous advancement through the heat exchanger, thereby to dehydrate the gravel by exchange of the heat stored in the sand and to cool the sand, separator means disposed relative to the discharge means of the heat exchanger for separating the dehydrated sand and gravel, a dry concrete mixer, a sand and gravel feeder extending from the separator means to the said mixer for advancing the dehydrated sand and gravel to the mixer, a cement feeder communicating with the dry concrete mixer for advancing dry cement to the mixer, and control means connected to the sand and gravel feeder and to the cement feeder for regulating the operation thereof, thereby to govern the quantity of sand and gravel and the quantity of cement which is fed to the dry concrete mixer, said control means providing a mixture of dry concrete for discharge from the mixer into a package.

13. An apparatus for continuously manufacturing and packaging dry, pre-mixed concrete, said apparatus comprising, a rotatable sand heater mounted upon a generally horizontal axis of rotation and having a charging and discharge end, means connected to said heater for rotating the same, feed means extending to the charging end of the sand heater for feeding a metered stream of raw moist sand to the rotating heater for passage therethrough, thereby to heat and dehydrate the advancing stream of sand, a heat exchanger mounted for rotation upon a generally horizontal axis and having a charging end and a discharge end, means connecting the discharge end of the sand heater to the charging end of the heat exchanger to direct the dehydrated hot sand into the heat exchanger, feed means extending to the charging end of the heat exchanger for advancing a metered stream of raw gravel to the rotating exchanger for passage therethrough with the hot sand to dehydrate the gravel by exchange of heat with the hot sand, screening means disposed at the discharge end of the heat exchanger for separating the dehydrated sand and gravel, a scale hopper for weighing a quantity of dehydrated sand and gravel, a sand and gravel feeder extending from the screening means to the scale hopper for advancing the sand and gravel to the scale hopper, a cement feeder communicating with said scale hopper for feeding dry cement thereto, and control means connected to said feeders for regulating the quantity of sand and gravel and the quantity of cement which is fed to the scale hopper to provide a batch of dry concrete for packaging.

14. In an apparatus for continuously dehydrating raw sand and gravel, a rotatable sand heater mounted upon a generally horizontal axis of rotation and having a charging end and a discharge end, means connected to said heater for rotating the same, raw sand feeding means communicating with the charging end of the sand heater for feeding sand into the heater for advancement during rotation of the heater, heater means mounted adjacent the the sand, mixing and agitating the dehydrated sand while substantially at said temperature with raw unheated aggregate to provide transfer of heat from the heated sand to the raw aggregate, the proportion of the aggregate and sand during heat transfer being substantially in the range of 40 to 55 percent aggregate, 60 to 45 percent sand, whereby the aggregate is heated and dehydrated by heat exchange while the temperature of the sand is lowered substantially, mixing the dehydrated sand and dehydrated aggregate with portland cement, and packaging said mixture in waterproof containers while the temperature of the mixture is at least 20 degrees F. above atmospheric temperature, thereby to prevent reabsorption of moisture from the atmosphere by the mixture.

29. In the process of manufacturing and packaging dry premixed concrete, the steps of advancing a stream of raw sand and during advancement agitating the sand in the presence of heat to raise the temperature of the sand sufficiently to dehydrate the same, mixing the stream of heated sand with a metered stream of raw unheated aggregate, mixing and advancing the streams of sand and aggregate to partially cool the sand and dehydrate the aggregate by heat transfer between the sand and aggregate, the proportion of aggregate and sand in said metered streams during heat transfer being substantially in the range of 40 to 55 percent aggregate to 60 to 45 percent sand, intermittently collecting predetermined quantities of the dehydrated sand and aggregate, and mixing the sand with predetermined quantities of dry hydraulic cement, and successively packaging said mixed quantities of sand, aggregate and cement in moisture resistant paper containers at a temperature sufficiently above atmospheric temperature to prevent reabsorption of moisture from the atmosphere by the mixture.

References Cited in the file of this patent

UNITED STATES PATENTS

| | | |
|---|---|---|
| 704,758 | Riley | July 15, 1902 |
| 808,599 | Crichfield | Dec. 26, 1905 |
| 916,448 | Jessup | Mar. 30, 1909 |
| 1,394,294 | Fasting | Oct. 18, 1921 |
| 2,179,485 | Avril | Nov. 14, 1939 |
| 2,530,501 | Avril | Nov. 21, 1950 |